(12) United States Patent
Halff

(10) Patent No.: US 9,353,956 B2
(45) Date of Patent: May 31, 2016

(54) HOT WATER RECIRCULATION SYSTEM TECHNOLOGIES

(71) Applicant: Lawrence Halff, San Francisco, CA (US)

(72) Inventor: Lawrence Halff, San Francisco, CA (US)

( * ) Notice: Subject to any disclaimer, the term of this patent is extended or adjusted under 35 U.S.C. 154(b) by 480 days.

(21) Appl. No.: 13/964,719

(22) Filed: Aug. 12, 2013

(65) Prior Publication Data
US 2015/0044062 A1  Feb. 12, 2015

(51) Int. Cl.
| F24D 17/00 | (2006.01) |
| F24D 19/10 | (2006.01) |
| F04B 49/06 | (2006.01) |
| F04B 49/10 | (2006.01) |

(52) U.S. Cl.
CPC .......... *F24D 17/0078* (2013.01); *F04B 49/065* (2013.01); *F04B 49/106* (2013.01); *F24D 19/1051* (2013.01); *Y10T 137/6497* (2015.04)

(58) Field of Classification Search
CPC . F24D 17/00; F24D 17/0078; F24D 19/1006; F24D 19/1051; Y10T 137/6497
USPC ...................................... 417/12, 43
See application file for complete search history.

(56) References Cited

U.S. PATENT DOCUMENTS

| 4,909,435 | A |  | 3/1990 | Kidouchi et al. | |
| 5,829,475 | A |  | 11/1998 | Acker | |
| 6,039,543 | A | * | 3/2000 | Littleton | F04B 49/02 417/12 |
| 6,962,162 | B2 |  | 11/2005 | Acker | |
| 7,306,008 | B2 | * | 12/2007 | Tornay | F17D 5/06 137/460 |
| 8,024,073 | B2 |  | 9/2011 | Imes et al. | |
| 8,204,633 | B2 |  | 6/2012 | Harbin, III et al. | |
| 8,231,064 | B2 | * | 7/2012 | Lum | E03B 1/048 137/337 |
| 8,285,129 | B2 | * | 10/2012 | Kim | F24D 17/0031 392/449 |
| 8,295,990 | B2 |  | 10/2012 | Venkatakrishnan et al. | |
| 8,327,873 | B2 |  | 12/2012 | Acker | |
| 8,396,602 | B2 |  | 3/2013 | Imes et al. | |
| 2011/0042468 | A1 |  | 2/2011 | Lee | |
| 2011/0231022 | A1 |  | 9/2011 | McNamara et al. | |
| 2012/0215725 | A1 |  | 8/2012 | Imes et al. | |

FOREIGN PATENT DOCUMENTS

| EP | 2306099 | 6/2011 |
| WO | WO9713186 | 4/1997 |
| WO | WO2009064080 | 5/2009 |
| WO | WO2011073962 | 6/2011 |

OTHER PUBLICATIONS

International Search Report; Nov. 14, 2014; 14 pages; International Application No. PCT/US2014/048637.

* cited by examiner

*Primary Examiner* — Peter J Bertheaud
(74) *Attorney, Agent, or Firm* — Goldstein Law Offices, P.C.

(57) ABSTRACT

Technologies for use with a hot water recirculation system containing a hot water source, a flow sensor downstream from the source, a booster pump downstream from the sensor, and a plumbing fixture downstream from the pump are provided. The technologies enable a controller to couple to the sensor and the pump, and operate in a calibration mode and a control mode. Such operations can increase energy efficiency of the pump and increase operational longevity of the pump.

20 Claims, 4 Drawing Sheets

HOT WATER RECIRCULATION SYSTEM TECHNOLOGIES

TECHNICAL FIELD

Generally, the present disclosure relates to plumbing. More particularly, the present disclosure relates to hot water recirculation systems.

BACKGROUND

In the present disclosure, where a document, an act and/or an item of knowledge is referred to and/or discussed, then such reference and/or discussion is not an admission that the document, the act and/or the item of knowledge and/or any combination thereof was at the priority date, publicly available, known to the public, part of common general knowledge and/or otherwise constitutes prior art under the applicable statutory provisions; and/or is known to be relevant to an attempt to solve any problem with which the present disclosure is concerned.

A hot water recirculation system is a plumbing technology for rapidly delivering hot water to a plumbing fixture for instant use. Such delivery is typically achieved via a booster pump installed downstream from a hot water source and upstream from the fixture. The pump is usually powered via a power source, such as mains electricity, a battery, a gas generator, a renewable energy source, and so forth. The pump is often operated more than necessary, which wastes energy and wears down the pump. As a result, some techniques for dealing with such method of operation have been devised. For example, one technique involves coupling the pump to a timer, which is programmed to activate the pump at times when hot water is typically needed. Another technique involves coupling the pump to a manual switch, which is operated to activate the pump for a set time period when hot water is needed. Yet another technique involves coupling the pump to a home security system, which when deactivated enables the pump to operate and when activated disables the pump from operating. Nevertheless, such techniques are ineffective at least because the timer can require readjustment due to varying schedules, the switch can be annoying to operate, and not every home is equipped with the home security system.

While certain aspects of conventional technologies have been discussed to facilitate the present disclosure, no technical aspects are disclaimed. The claims may encompass at least one of the conventional technical aspects discussed herein.

BRIEF SUMMARY

The present disclosure addresses at least one of the above. However, the present disclosure may prove useful in addressing other problems and/or deficiencies in a number of technical areas. Therefore, the claims, as recited below, should not necessarily be construed as limited to addressing any of the particular problems and/or deficiencies discussed herein.

According to an example embodiment of the present disclosure a device for use with a hot water recirculation system containing a hot water source, a flow sensor downstream from the source, a booster pump downstream from the sensor, and a plumbing fixture downstream from the pump is provided. The device includes a controller configured for coupling to the sensor and the pump. The controller is operative in one of a calibration mode and a control mode when coupled to the sensor and the pump. In the calibration mode, the controller determines a resting flow rate and an in-use flow rate via the sensor. The resting rate is determined when the pump avoids pumping water and the fixture avoids drawing water. The in-use rate is determined when the pump pumps water and the fixture draws water pumped via the pump. The controller determines a first time period indicative of time for returning from at least the in-use rate to the resting rate when the pump avoids pumping water and the fixture avoids drawing water. The controller receives an input from a user for a second time period. In the control mode, the controller controls the pump to pump water for duration of the second period based on the input in response to sensing at least the in-use rate via the sensor. The controller controls the pump to avoid pumping water immediately after expiration of the second period for duration of at least the first period.

According to another example embodiment of the present disclosure a hot water recirculation system is provided. The system includes a hot water source, a flow sensor downstream from the source, a booster pump downstream from the sensor, a plumbing fixture downstream from the pump, and a controller coupled to the sensor and the pump. The controller is operative in one of a calibration mode and a control mode. In the calibration mode, the controller determines a resting flow rate and an in-use flow rate via the sensor. The resting rate is determined when the pump avoids pumping water and the fixture avoids drawing water. The in-use rate is determined when the pump pumps water and the fixture draws water pumped via the pump. The controller determines a first time period indicative of time for returning from at least the in-use rate to the resting rate when the pump avoids pumping water and the fixture avoids drawing water. The controller receives an input from a user for a second time period. In the control mode, the controller controls the pump to pump water for duration of the second period based on the input in response to sensing at least the in-use rate via the sensor. The controller controls the pump to avoid pumping water immediately after expiration of the second period for duration of at least the first period.

According to yet another example embodiment of the present disclosure a method for use with a hot water recirculation system containing a hot water source, a flow sensor downstream from the source, a booster pump downstream from the sensor, and a plumbing fixture downstream from the pump is provided. The method includes coupling a controller to the sensor and the pump. The controller is programmed for operation in one of a calibration mode and a control mode. The method further includes operating the controller in the calibration mode such that the controller determines a resting flow rate and an in-use flow rate via the sensor. The resting rate is determined when the pump avoids pumping water and the fixture avoids drawing water. The in-use rate is determined when the pump pumps water and the fixture draws water pumped via the pump. The controller determines a first time period indicative of time for returning from at least the in-use rate to the resting rate when the pump avoids pumping water and the fixture avoids drawing water. The controller receives an input from a user for a second time period. The method also includes operating the controller in the control mode such that the controller controls the pump to pump water for duration of the second period based on the input in response to sensing at least the in-use rate via the sensor. The controller controls the pump to avoid pumping water immediately after expiration of the second period for duration of at least the first period.

The present disclosure may be embodied in the form illustrated in the accompanying drawings. Attention is called to the fact, however, that the drawings are illustrative. Variations are contemplated as being part of the disclosure, limited only by the scope of the claims. The above and other features, aspects and advantages of the present disclosure will become better understood to one skilled in the art with reference to the following drawings, detailed description and appended claims.

BRIEF DESCRIPTION OF THE DRAWINGS

The accompanying drawings illustrate example embodiments of the present disclosure. Such drawings are not to be construed as necessarily limiting the present disclosure. Like numbers and/or similar numbering scheme can refer to like and/or similar elements throughout.

DETAILED DESCRIPTION OF THE PREFERRED EMBODIMENTS

Figure 1:
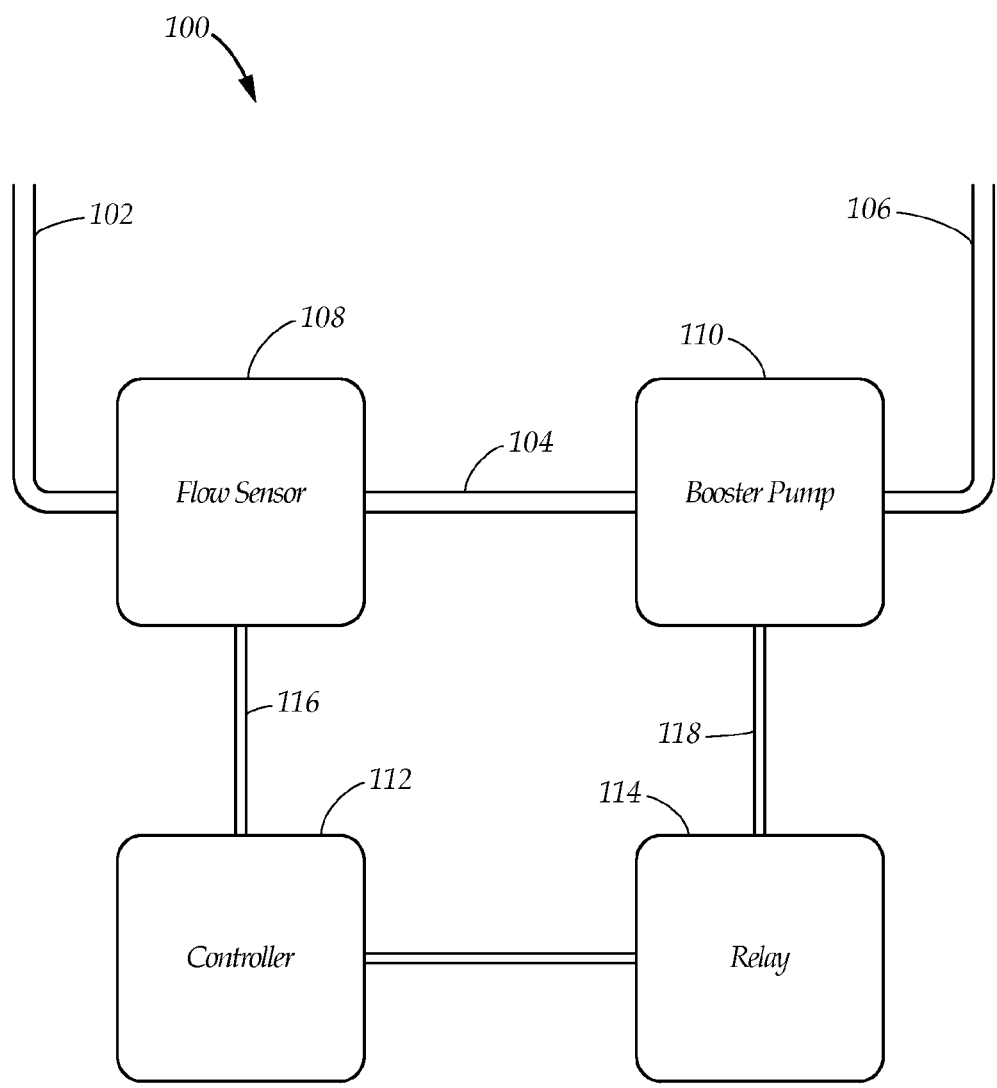
FIG. 1 shows a segment of a schematic diagram of an example embodiment of a hot water recirculation system according to the present disclosure.

The present disclosure is now described more fully with reference to the accompanying drawings, in which example embodiments of the present disclosure are shown. The present disclosure may, however, be embodied in many different forms and should not be construed as necessarily being limited to the example embodiments set forth herein. Rather, these example embodiments are provided so that the disclosure is thorough and complete, and fully conveys the concepts of the present disclosure to those skilled in the art. Also, features described with respect to certain example embodiments may be combined in and/or with various other example embodiments. Different aspects and/or elements of example embodiments, as disclosed herein, may be combined in a similar manner.

The terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, and so forth may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three dimensional (3D) printing, laser cutting, computer numerical control (CNC) routing, milling, pressing, stamping, vacuum forming, hydroforming, injection molding, lithography, and so forth.

Any and/or all elements, as disclosed herein, can include, whether partially and/or fully, a solid, including a metal, a mineral, an amorphous material, a ceramic, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating, antibacterial coating, and/or any combinations thereof. Any and/or all elements, as disclosed herein, can be rigid, flexible and/or any other combinations thereof. Any and/or all elements, as disclosed herein, can be identical and/or different from each other in material, shape, size, color and/or any measurable dimension, such as length, width, height, depth, area, orientation, perimeter, volume, breadth, density, temperature, resistance, and so forth.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

Any and/or all blocks of processes described herein can be performed, whether via hardware logic and/or software logic, by and/or on behalf of one and/or more entities/parties, irrespective of their relationship to each other. Also, any and/or all blocks of processes described herein can be a part of a larger process, irrespective of any relation to the contents of the present disclosure. For example, various functions can be taking place before, during and/or after performance of at least one blocks of any of the processes described herein, whether on a same or a different hardware. Alternatively, any and/or all blocks of processes described herein can be performed on their own as well, whether on a same or a different hardware. Further, any and/or all blocks of processes described herein can be performed relatively contemporaneously and/or non-contemporaneously.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

FIG. 1 shows a segment of a schematic diagram of an example embodiment of a hot water recirculation system according to the present disclosure. A hot water recirculation system 100 includes a first conduit section 102, a second conduit second 104, and a third conduit section 106. System 100 includes a hot water source, such as a boiler, a hot water storage tank, and so forth. Note that a plurality of hot water sources can also be used within system 100, whether identical to and/or different from each other. System 100 also includes a plumbing fixture, such as a faucet, an appliance, and so forth, downstream from the hot water source. The fixture is in fluid communication with section 106. Note that a plurality of the plumbing fixtures can also be used within system 100, whether identical to and/or different from each other.

Section 102 can include a tube, a hose, and so forth. Section 102 is configured such that a fluid, such as a liquid and/or a gas, can flow therethrough. Section 102 can be in fluid communication with the hot water source.

Section 104 can include a tube, a hose, and so forth. Section 104 is configured such that a fluid, such as a liquid and/or a gas, can flow therethrough. Section 104 can be identical to and/or different from section 102 in any measurable dimension.

Section 106 can include a tube, a hose, and so forth. Section 106 is configured such that a fluid, such as a liquid and/or a gas, can flow therethrough. Section 106 can be identical and/or different from section 102 and/or section 104 in any measurable dimension.

System 100 also includes a flow sensor 108 in fluid communication with section 102 and section 104 such that sensor 108 is fluidly between section 102 and section 104. Sensor 108 is operative for sensing a rate of fluid flow of fluid input thereinto. Sensor 108 can include a vane, which is pushable via the fluid. Sensor 108 can further be operative for measuring a velocity of fluid flow. Sensor 108 can be powered via a power source, such as mains electricity, a battery, a gas generator, a renewable energy source, and so forth. Sensor 108 also can be non-powered as well. Sensor 108 can be analog and/or digital based.

System 100 further includes a booster pump 110 in fluid communication with section 104 and section 106 such that pump 110 is fluidly between section 104 and section 106. Pump 110 is operative for boosting fluid pressure of fluid input from section 104 and outputting the boosted fluid to segment 106. Pump 110 is powered via a power source, such as mains electricity, a battery, a gas generator, a renewable energy source, and so forth. Pump 110 and sensor 108 can be powered via an identical and/or a different power source. Pump 110 can be analog and/or digital based. In another example embodiment, sensor 108 and pump 110 are combined as one operational unit.

System 100 moreover includes a controller 112 and a relay 114. Controller 112 is coupled to sensor 108 via a connection 116, which can be wired and/or wireless, encrypted and/or unencrypted, direct and/or indirect, local and/or remote. Relay 114 is coupled to pump 110 via a connection 118, which can be wired and/or wireless, encrypted and/or unencrypted, direct and/or indirect, local and/or remote. Connection 116 and connection 118 can be identical to and/or different from each other in any manner. Controller 112 and relay 114 are coupled to each other, whether via wired and/or wireless manner, encrypted and/or unencrypted manner, direct and/or indirect manner, local and/or remote manner.

In another example embodiment, controller 112 is coupled to pump 110 with and/or without relay 114, whether with and/or without connection 118. In yet another example embodiment, relay 114 is lacking. In yet still another example embodiment, pump 110 and relay 114 are combined as one operational unit. In yet still another example embodiment, controller 112 and relay 114 are combined as one operational unit. In additional another example embodiment, sensor 108 and controller 112 are combined as one operational unit. In yet still another additional example embodiment, sensor 108 and relay 114 are combined as one operational unit. In still yet another example embodiment, pump 110 and controller 112 are combined as one operational unit.

Controller 112 is powered via a power source, such as mains electricity, a battery, a gas generator, a renewable energy source, and so forth. Controller 112 receives fluid flow sensory information from sensor 108 via connection 116. Controller 112 can activate and/or deactivate sensor 108 via connection 116. Controller 112 can communicate with sensor 108 for other purposes as well via connection 116 and/or some other connection.

Relay 114 includes an electrically operated switch. Alternatively, relay 114 can include a mechanically operated switch. Relay 114 is operative to switch on pump 110 via connection 118 and switch off pump 110 via connection 118. Relay 114 can be electromagnet based. Relay 114 can be a high current relay controller. Relay 114 can be operated via controller 112.

Controller 112 at least partially controls pump 110 via connection 118. Controller 110 can activate pump 110 and deactivate pump 110 via connection 118. Controller 112 can receive data, such as operational data, from pump 110. Controller 112 can communicate with pump 110 for other purposes as well via connection 118 and/or some other connection.

Controller 112 can be housed within a housing, which can include, plastic, metal, wood, rubber, and so forth. Controller 112 can control at least pump 110 based on hardware and/or software. The housing can contain such logic for communicating with sensor 108 and controlling pump 110. For example, the logic can include at least one of a circuit, a computer readable storage medium, a processor, a receiver, a transmitter, a transceiver, a user input interface, whether virtual and/or non-virtual based, and so forth.

Controller 112 is operative in one of a calibration mode and a control mode. Such modes are for operation of controller 112 when coupled to sensor 108 and pump 110. Such modes can be selected via a user, such as a human, an appliance, and so forth, at any time, such as for initial calibration, recalibration, and so forth. Further, such modes can be automatically alternated via controller 112 when controller 112 determines that calibration is needed based on a heuristic and/or at least one criteria, whether user input and/or manufacturer preset. In some example embodiments, controller 112 runs in the calibration mode before the control mode.

In the calibration mode, controller 112 determines a resting flow rate via sensor 108 and an in-use flow rate via sensor 108. Such rates can be based on any measurement systems, any time systems, and so forth.

The resting rate is determined when pump 110 avoids pumping water, such as hot water from the hot water source, and the plumbing fixture downstream from pump 110 avoids drawing water, such as hot water at least from pump 110. Resultantly, the resting rate is determined for duration of a time period, where the resting rate is a maximum flow sensed via sensor 108 during that time period. The resting rate may be caused by gravity or environmental factors affecting system 100. The resting rate indicates that that the user is not drawing water, such as hot water, from system 100 and pump 110 is not pumping water, such as hot water, within system 100.

The in-use rate is determined when pump 110 pumps water, such as hot water from the hot water source, and the plumbing fixture downstream from pump 110 draws water, such as hot water pumped via pump 110. The in-use rate is determined via the user operating the plumbing fixture downstream from pump 110 for duration of a time period after determining the resting rate. The in-use rate is a minimum flow sensed via sensor 108 during that time period. Controller 112 receives an indication from said the before determining that time period. Such receipt can be wired and/or wireless, encrypted and/or unencrypted, direct and/or indirect, local and/or remote. The indication is indicative that a process for determining the in-use rate is at least partially complete. The in-use rate indicates that the user is drawing water, such as hot water, from system 100.

Controller 112 determines a time period indicative of time for returning from at least the in-use rate to the resting rate when pump 110 avoids pumping water, such as hot water from the hot water source, and the plumbing fixture avoids drawing water, such as hot water, from system 100. The time to the rest rate is determined via controller 112 controlling pump 110 to pump water, such as hot water from the hot water source, for duration of a time period after determination of the in-use rate. Such time period is sufficiently long to induce flow back to at least to the hot water source. Therefore, the time to the rest rate corresponds to time as determined via controller 112 for system 100 flow rate as determined via sensor 108 sensor to return to the resting rate. The time to the rest rate indicates time system 100 to return to the rest rate after pump 110 has been turned off. Note that the time to the rest rate can be determined via iteration such that flow variation within system 100 is accounted for. In such iteration, the time to the rest rate corresponds to a longest reading taken during the iteration via controller 112.

Controller 112 receives an input from the user for a time period, which is indicative of at least how long should pump 110 pump hot water for from the hot water source when system 110 detects demand, such as from the user. Controller 112 receipt of the input can be wired and/or wireless, encrypted and/or unencrypted, direct and/or indirect, local and/or remote. In one example embodiment, controller 112 can contain a user interface, such as a virtual interface, a mechanical interface, a network interface, an application programming interface (API) and so forth, configured for operation via the user. Therefore, controller 112 is operative for receiving the input via the interface from the user in the calibration mode. In another example embodiment, controller 112 can be configured to receive a wireless signal, whether encrypted and/or unencrypted, direct and/or indirect. Such signal can be from a mobile device, such as a tablet computer, a mobile phone, a remote control device, and so forth. Such signal can also be from a stationary device, such as a desktop computer, a computer terminal, an appliance, a control panel, and so forth. Controller 112 is operative for receiving the input via the signal in the calibration mode. In another example embodiment, the mobile device and/or the stationary device can allow for user selection of the modes of operation of controller 112, such as switching between the calibration mode and the control mode.

In the control mode, controller 112 controls pump 110 to pump water, such as hot water from the hot water source, for duration of the user input time period in at least partial response to sensing at least the in-use rate via sensor 108. Controller 112 controls pump 110 to avoid pumping water, such as hot water from the hot water source, immediately after expiration of the user input time period for duration of at least the time to the rest rate. Note that in the control mode, controller 112 is configured for controlling pump 110 via relay 114 coupled to controller 112 and pump 110.

In another example embodiment, controller 112 is started in the calibration mode after an extended idle period during which pump 110 has not been running nor has water been drawn from the plumbing fixture.

In the calibration mode, controller 112 operates in four phases. In phase one, the resting rate is determined. Such determination is made over a sufficient period of time where system 100 records readings from sensor 108 and sets the resting rate to the maximum flow reading recorded. In phase two, the in-use rate is determined where the user is instructed to go to every every plumbing fixture one at a time and turn the fixture on for a sufficient period of time. The user then indicates to controller 112 that such process is complete. The in-use rate is then set to the lowest interval reading above the resting rate. In phase three, the time to the resting rate is determined via controller 112 turning on pump 110 on for a sufficient period of time to induce flow through system 110 and then measure time for the flow rate to reach the resting rate. Controller 112 may iterate steps more than once in order to eliminate natural variation and setting the time to the resting rate to the longest reading taken. In phase four, controller 112 receives user input corresponding to time to run pump 110.

In the control mode, controller 112 operates in four phases. In phase one, controller 112 data from sensor 108. In phase two, when controller 112 senses the flow rate reach or surpass the in-use rate, controller 112 turns on the pump 110. In phase three, controller waits for duration of time corresponding to the user input in phase four of the calibration mode. Upon expiration of such time, controller 112 turns off pump 110. In phase four, controller waits for the time to rest rate then returns to phase one of the control mode. Resultantly, pump 110 is operated based at least in part on hot water demand, which can be more efficient than predicting hot water usage or estimating time when hot water usage demand. Such operation can increase energy efficiency and/or increase operational longevity of pump 110.

Figure 2:
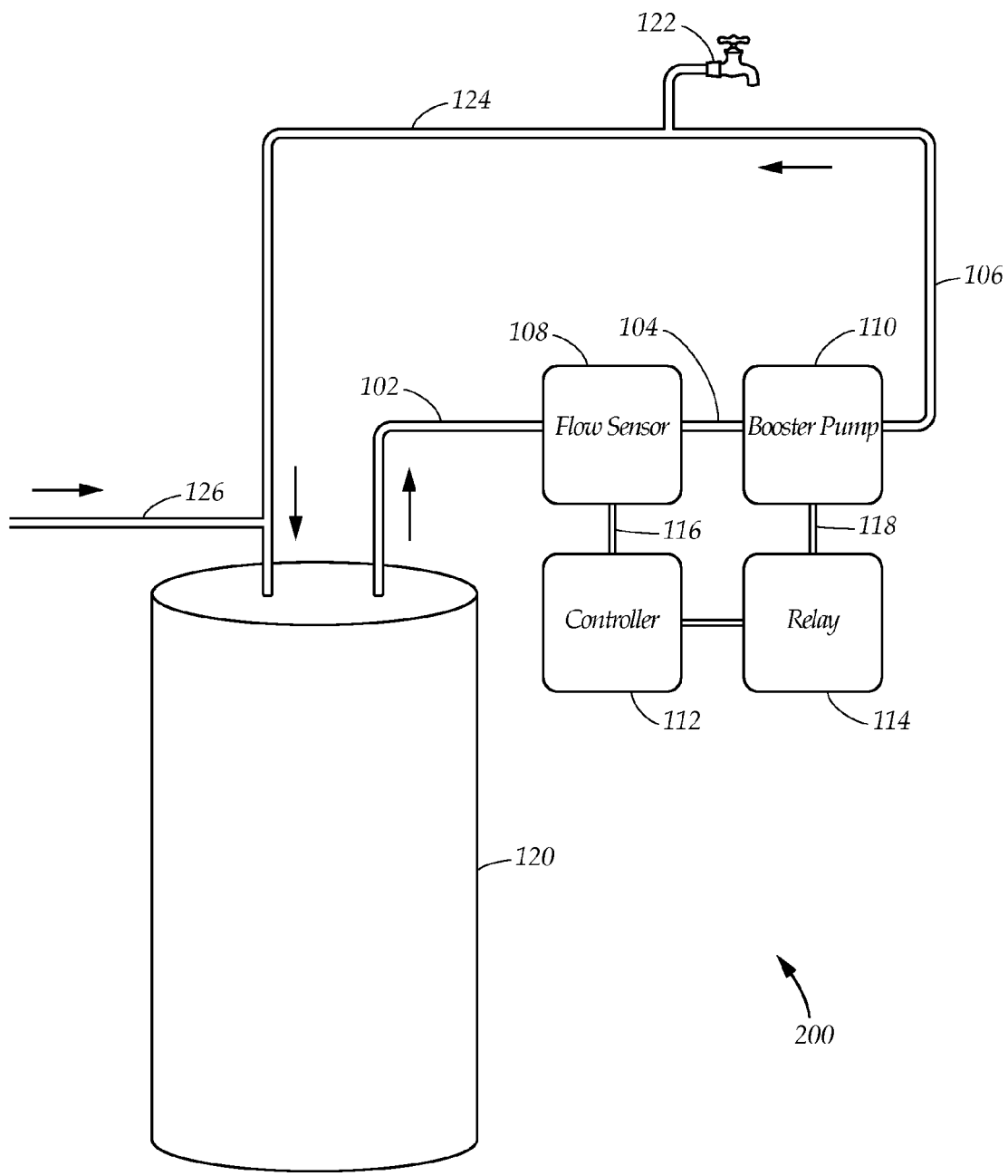
FIG. 2 shows a segment of a schematic diagram of an example embodiment of a plumbing fixture and a hot water source within the hot water recirculation system according to the present disclosure.

FIG. 2 shows a segment of a schematic diagram of an example embodiment of a plumbing fixture and a hot water source within the hot water recirculation system according to the present disclosure. Some concepts depicted in this figure are described above. Thus, same reference characters identify same or like components described above and any repetitive detailed description thereof will hereinafter be omitted or simplified in order to avoid complication.

A system 200 includes a hot water source 120, which can be a boiler, a hot water storage tank, and so forth. Source 120 is in fluid communication with section 102. Note that a plurality of sources 120 can also be used within system 200, whether identical to and/or different from each other. Sources 120 can be placed in any place within system 200, whether downstream from pump 110 and/or upstream pump 110. Source System 200 also includes a plumbing fixture 122, such as a faucet, an appliance, and so forth, downstream from source 120. Fixture 122 is in fluid communication with section 106. Note that a plurality of fixtures 122 can also be used within system 200, whether identical to and/or different from each other. Fixtures 122 can be placed in any place within system 200 whether downstream from pump 110 and/or upstream pump 110. Also note that fixture 122 can be operative to output just cold water and/or output cold water mixed with hot water pumped via pump 110.

System 200 further includes a fourth conduit section 124, which is in fluid communication with fixture 122 for recirculation hot water back to source 120. Section 124 can include a tube, a hose, and so forth. Section 124 is configured such that a fluid, such as a liquid and/or a gas, can flow therethrough.

System 200 additionally includes a fifth conduit section 126, which can include a tube, a hose, and so forth. Section 126 is configured such that a fluid, such as a liquid and/or a gas, can flow therethrough. Section 126 is in fluid communication with section 124 and source 120. Section 126 can be in fluid with another booster pump and/or another hot water source.

Figure 3:
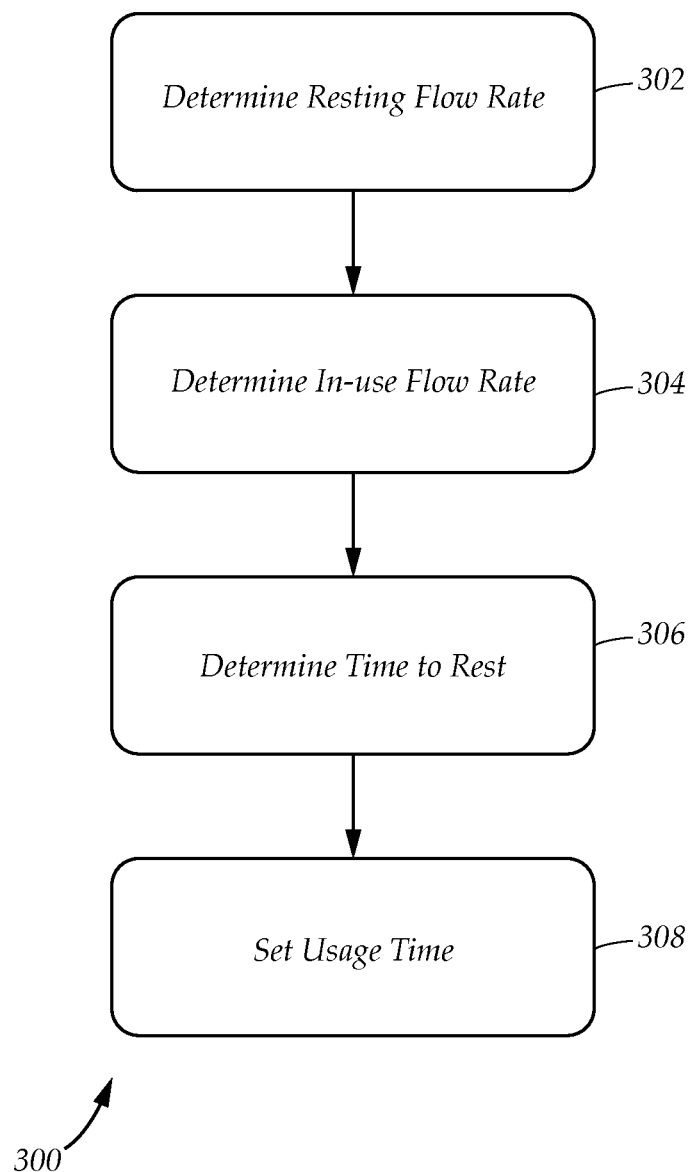
FIG. 3 shows a flowchart of an example embodiment of a calibration mode process according to the present disclosure.

FIG. 3 shows a flowchart of an example embodiment of a calibration mode process according to the present disclosure. Some concepts depicted in this figure are described above. Thus, same reference characters identify same or like components described above and any repetitive detailed description thereof will hereinafter be omitted or simplified in order to avoid complication.

A calibration mode process 300 includes a plurality of blocks 302-308. Note that process 300 can be performed in a different order than depicted. Further, note that process 300 can be performed via at least one entity.

Block 302 entails determining the resting rate, as described herein.

Block 304 entails determining the in-use rate, as described herein.

Block 306 entails determining the time to the rest rate, as described herein.

Block 308 entails setting usage time, which corresponds to controller 112 receiving the input from the user for the time period indicative of at least how long should pump 110 pump hot water for from the hot water source when system 110 detects demand, such as from the user. Therefore, controller 112 sets the input as the usage time.

Controller 112 receipt of the input can be wired and/or wireless, encrypted and/or unencrypted, direct and/or indirect, local and/or remote. In one example embodiment, controller 112 can contain the user interface, such as a virtual interface, a mechanical interface, a network interface, an application programming interface (API) and so forth, configured for operation via the user. Therefore, controller 112 is operative for receiving the input via the interface from the user in the calibration mode. In another example embodiment, controller 112 can be configured to receive a wireless signal, whether encrypted and/or unencrypted, direct and/or indirect. Such signal can be from a mobile device, such as a tablet computer, a mobile phone, a remote control device, and so forth. Such signal can also be from a stationary device, such as a desktop computer, a computer terminal, an appliance, a control panel, and so forth. Controller 112 is operative for receiving the input via the signal in the calibration mode. In another example embodiment, the mobile device and/or the stationary device can allow for user selection of the modes of operation of controller 112, such as switching between the calibration mode and the control mode.

Figure 4:
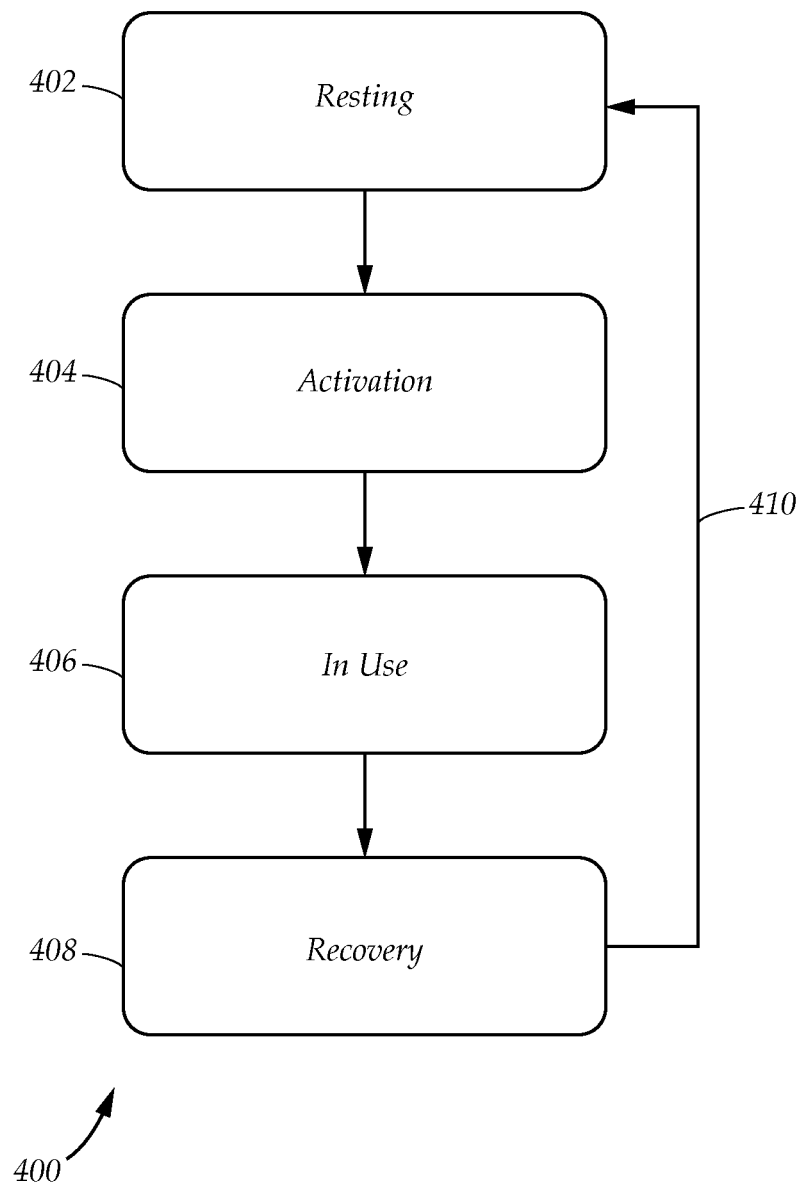
FIG. 4 shows a flowchart of an example embodiment of an operational mode process according to the present disclosure.

FIG. 4 shows a flowchart of an example embodiment of an operational mode process according to the present disclosure. Some concepts depicted in this figure are described above. Thus, same reference characters identify same or like components described above and any repetitive detailed description thereof will hereinafter be omitted or simplified in order to avoid complication.

An operation mode process 400 includes a plurality of blocks 402-408. Note that process 400 can be performed in a different order than depicted. Further, note that process 400 can be performed via at least one entity.

Block 402 entails resting controller 112 to receive flow data from sensor 108.

Block 404 entails activating pump 110 via controller 112 to pump water, such as hot water from the hot water source, for duration of the user input time period in at least partial response to sensing at least the in-use rate via sensor 108.

Block 406 entails pumping hot water via pump 110 for duration of the user input time period.

Block 408 entails controller 112 controlling pump 110 to avoid pumping water, such as hot water from the hot water source, immediately after expiration of the user input time period for duration of at least the time to the rest rate.

Return 410 allows controller 112 to repeat process 400 more than once in order to eliminate natural variation and setting the time to the resting rate to the longest reading taken.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, and so forth) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, and so forth, or any suitable combination of the foregoing. Computer program code for carrying out operations for aspects of the present disclosure may be written in any combination of one or more programming languages, including an object oriented programming language, such as Java, Smalltalk, C#, C++ or the like, and conventional procedural programming languages, such as the "C" programming language or similar programming languages. Other types of programming languages include HTML5, Flash and other similar languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure, the practical application thereof, and to enable others of ordinary skill in the art to understand the disclosure for various embodiments with various modifications as are suited at least to the particular use contemplated.

The flow diagrams depicted herein are just one example. There may be many variations to this diagram or the steps (or operations) described therein without departing from the spirit of the disclosure. For instance, the steps may be performed in a differing order or steps may be added, deleted or modified. All of these variations are considered a part of the claimed disclosure.

The description of the present disclosure has been presented for purposes of illustration and description, but is not intended to be fully exhaustive and/or limited to the disclosure in the form disclosed. Many modifications and variations in techniques and structures will be apparent to those of ordinary skill in the art without departing from the scope and spirit of the disclosure as set forth in the claims that follow. Accordingly, such modifications and variations are contemplated as being a part of the present disclosure. The scope of the present disclosure is defined by the claims, which includes known equivalents and unforeseeable equivalents at the time of filing of the present disclosure.

What is claimed is:

1. A device for use with a hot water recirculation system containing a hot water source, a flow sensor downstream from said source, a booster pump downstream from said sensor, and a plumbing fixture downstream from said pump, said device comprising:
a controller configured for coupling to said sensor and said pump, said controller operative in one of a calibration mode and a control mode when coupled to said sensor and said pump,
in said calibration mode, said controller determines a resting flow rate and an in-use flow rate via said sensor, said resting rate determined when said pump avoids pumping water and said fixture avoids drawing water, said in-use rate determined when said pump pumps water and said fixture draws water pumped via said pump, said controller determines a first time period indicative of time for returning from at least said in-use rate to said resting rate when said pump avoids pumping water and said fixture avoids drawing water, said controller receives an input from a user for a second time period,
in said control mode, said controller controls said pump to pump water for duration of said second period based on said input in response to sensing at least said in-use rate via said sensor, said controller controls said pump to avoid pumping water immediately after expiration of said second period for duration of at least said first period.

2. The device of claim 1, wherein, in said calibration mode, said resting rate is determined for duration of a third time period, said resting rate is a maximum flow sensed via said sensor during said third period.

3. The device of claim 2, wherein, in said calibration mode, said in-use rate is determined via said user operating said fixture for duration of a fourth time period after said third period, said in-use rate is a minimum flow sensed via said sensor during said fourth period, said controller receiving an indication from said user before determining said first period, said indication indicative that a process for determining said in-use rate is complete.

4. The device of claim 3, wherein, in said calibration mode, said first period is determined via said controller controlling said pump to pump water for duration of a fifth time period after said fourth period, said fifth period is sufficiently long to induce flow back to at least said source, said first period corresponding to time as determined via said controller for flow rate as determined via said sensor to return to said resting rate.

5. The device of claim 4, wherein, in said calibration mode, said first period is determined via iteration such that flow variation is accounted for, said first period corresponding to a longest reading taken during said iteration via said controller, wherein, in said control mode, said controller is configured for controlling said pump via a switch coupled to said controller and said pump.

6. The device of claim 1, wherein said controller containing a user interface configured for operation via said user, said controller is operative for receiving said input via said interface from said user in said calibration mode.

7. The device of claim 1, wherein said controller is configured to receive a wireless signal, said controller is operative for receiving said input via said signal in said calibration mode.

8. A hot water recirculation system comprising:
a hot water source;
a flow sensor downstream from said source;
a booster pump downstream from said sensor;
a plumbing fixture downstream from said pump;
a controller coupled to said sensor and said pump, said controller operative in one of a calibration mode and a control mode,
in said calibration mode, said controller determines a resting flow rate and an in-use flow rate via said sensor, said resting rate determined when said pump avoids pumping water and said fixture avoids drawing water, said in-use rate determined when said pump pumps water and said fixture draws water pumped via said pump, said controller determines a first time period indicative of time for returning from at least said in-use rate to said resting rate when said pump avoids pumping water and said fixture avoids drawing water, said controller receives an input from a user for a second time period,
in said control mode, said controller controls said pump to pump water for duration of said second period based on said input in response to sensing at least said in-use rate via said sensor, said controller controls said pump to avoid pumping water immediately after expiration of said second period for duration of at least said first period.

9. The system of claim 8, wherein, in said calibration mode, said resting rate is determined for duration of a third time period, said resting rate is a maximum flow sensed via said sensor during said third period.

10. The system of claim 9, wherein, in said calibration mode, said in-use rate is determined via said user operating said fixture for duration of a fourth time period after said third period, said in-use rate is a minimum flow sensed via said sensor during said fourth period, said controller receiving an indication from said user before determining said first period, said indication indicative that a process for determining said in-use rate is complete.

11. The system of claim 10, wherein, in said calibration mode, said first period is determined via said controller controlling said pump to pump water for duration of a fifth time period after said fourth period, said fifth period is sufficiently long to induce flow back to at least said source, said first period corresponding to time as determined via said controller for flow rate as determined via said sensor to return to said resting rate.

12. The system of claim 11, further comprising a switch coupled to said controller and said pump, said controller controlling said pump via said switch in said control mode, wherein, in said calibration mode, said first period is determined via iteration such that flow variation is accounted for, said first period corresponding to a longest reading taken during said iteration via said controller.

13. The system of claim 8, wherein said controller containing a user interface configured for operation via said user, said controller is operative for receiving said input from said user via said interface in said calibration mode.

14. The system of claim 8, wherein said controller is configured to receive a wireless signal, said controller is operative for receiving said input via said signal in said calibration mode.

15. A method for use with a hot water recirculation system containing a hot water source, a flow sensor downstream from said source, a booster pump downstream from said sensor, and a plumbing fixture downstream from said pump, said method comprising:

coupling a controller to said sensor and said pump, said controller programmed for operation in one of a calibration mode and a control mode;

operating said controller in said calibration mode such that said controller determines a resting flow rate and an in-use flow rate via said sensor, said resting rate determined when said pump avoids pumping water and said fixture avoids drawing water, said in-use rate determined when said pump pumps water and said fixture draws water pumped via said pump, said controller determines a first time period indicative of time for returning from at least said in-use rate to said resting rate when said pump avoids pumping water and said fixture avoids drawing water, said controller receives an input from a user for a second time period;

operating said controller in said control mode such that said controller controls said pump to pump water for duration of said second period based on said input in response to sensing at least said in-use rate via said sensor, said controller controlling said pump to avoid pumping water immediately after expiration of said second period for duration of at least said first period.

16. The method of claim 15, wherein, in said calibration mode, said resting rate is determined for duration of a third time period, said resting rate is a maximum flow sensed via said sensor during said third period.

17. The method of claim 16, wherein, in said calibration mode, said in-use rate is determined via said user operating said fixture for duration of a fourth time period after said third period, said in-use rate is a minimum flow sensed via said sensor during said fourth period, said controller receiving an indication from said user before determining said first period, said indication indicative that a process for determining said in-use rate is complete.

18. The method of claim 17, wherein, in said calibration mode, said first period is determined via said controller controlling said pump to pump water for duration of a fifth time period after said fourth period, said fifth period is sufficiently long to induce flow back to at least said source, said first period corresponding to time as determined via said controller for flow rate as determined via said sensor to return to said resting rate.

19. The method of claim 18, wherein, in said calibration mode, said first period is determined via iteration such that flow variation is accounted for, said first period corresponding to a longest reading taken during said iteration via said controller, wherein, in said control mode, said controller is configured for controlling said pump via a switch coupled to said controller and said pump.

20. The method of claim 15, wherein said controller includes at least one of a user interface configured for operation via said user and a wireless signal receiver, said controller is operative for at least one of receiving said input via said interface from said user in said calibration mode and receiving said input via said receiver in said calibration mode.

* * * * *